United States Patent Office 3,549,600
Patented Dec. 22, 1970

3,549,600
STOVING LACQUERS
Ferdinand Senge and Bernd Peltzer, Krefeld, and Hermann Schnell, Krefeld-Urdingen, Germany, assignors to Farbenfabriken Bayer Aktiengesellschaft, Leverkusen, Germany, a corporation of Germany
No Drawing. Filed July 2, 1968, Ser. No. 741,881
Claims priority, application Germany, Sept. 7, 1967,
F 53,435
Int. Cl. C08g 22/06, 22/10
U.S. Cl. 260—77.5                                     3 Claims

ABSTRACT OF THE DISCLOSURE

This invention relates to spontaneously cross-linking vehicles for stoving lacquers of copolymers of (a) 90 to 60% by weight of one or more monoethylenically unsaturated monomers different from (b); and (b) 10 to 40% by weight of a β- or γ-hydroxylalkyl ester of a monoethylenically unsaturated carboxylic acid, some of the hydroxyl groups being reacted with aromatic dicarboxylic acid anhydrides to form semiesters, and the remaining hydroxyl groups being partly or totally reacted with α-alkoxyalkylisocyanates to form corresponding urethanes. The invention also relates to a process for the production of these copolymers and stoving lacquers obtained from these copolymers.

---

This invention relates to spontaneously cross-linking vehicles for stoving lacquers of copolymers of (a) 90 to 60% by weight of one or more monoethylenically unsaturated monomers different from (b); and (b) 10 to 40% by weight of a β- or γ-hydroxyalkyl ester of a monoethylenically unsaturated carboxylic acid, some of the hydroxyl groups being reacted with aromatic dicarboxylic acid anhydrides to form semiesters, and the remaining hydroxyl groups being partly or totally reacted with α-alkoxyalkylisocyanates to form corresponding urethanes. The invention also relates to a process for the production of these copolymers and stoving lacquers obtained from these copolymers.

Spontaneously cross-linking copolymers containing α-alkoxyalkyl urethane groups are already known. They are described in DAS No. 1,244,410 and are spontaneously cross-linking plastics or plastics intermediates. If lacquer vehicles are prepared from these compounds, the resulting vehicles show considerable advantages over multi-component systems (acrylic resin/melamine resin), because there are never any problems of compatibility in this single-component system. Unfortunately, they are still not altogether satisfactory because high stoving temperatures (150–180° C.) and long periods of time are required to harden coatings prepared with them. Although the hardening of these vehicles can be accelerated by the addition of acids as catalysts, such a measure involves disturbances due to the catalyst crystallising out and settling in the untreated material, and promotes surface faults, film formation and inadequate weathering resistance in the stoved lacquer.

Attempts have also been made to polymerise ethylenically unsaturated carboxylic acids, intended to act as inner acid hardening catalysts, into vehicles for stoving lacquers containing amide-methylolethers (cf. DAS No. 1,083,548 and DAS No. 1,089,549). Although it is possible in this way to reduce the stoving temperature from 180° C. to 150° C. the resistance of the vehicles, for example, to washing solutions, becomes increasingly weaker with increasing acid content.

In the case of vehicles containing α-alkoxyalkyl urethane groups, this method is unable to produce any appreciable reduction in the stoving temperature, or to improve the adhesion of the lacquer film to the substrate.

The vehicles according to the present invention obviate all these disadvantages. They can be hardened at low temperatures (approximately 130° C.) and in short times (approximately 30 minutes). No additives are necessary. The lacquer films thus obtained show outstanding elasticity, bond strength and resistance to yellowing, even at fairly high temperatures.

The vehicles according to the invention consist of copolymers of: (a) 90 to 60% by weight of one or more monoethylenically unsaturated monomers different from (b); (b) 10 to 40% by weight of a β- or γ-hydroxyalkylester of a monoethylenically unsaturated carboxylic acid, part of the hydroxyl groups in this hydroxyalkyl ester being reacted with aromatic dicarboxylic acid anhydrides to form the corresponding semiesters, and the remaining hydroxyl groups being partly or totally reacted with α-alkoxyalkyl isocyanates to form the corresponding urethanes. These substances are generally used in the form of a 40 to 60% by weight solution in a suitable aromatic solvent for the production of lacquer coatings.

Monoethylenically unsaturated monomers (a) that are suitable for the vehicles according to the invention include, in particular, alkyl esters of acrylic or methacrylic acid with 1 to 18 carbon atoms in the alkyl group, such as, for example, ethylacrylate, methylmethacrylate, butyl methacrylate, 2-ethyl hexylacrylate. They also include acrylonitrile, methacrylonitrile, styrene, α-methylstyrene and vinyl toluene, i.e., aromatic vinyl compounds and vinyl esters of aliphatic carboxylic acids, for example, vinyl acetate, vinyl propionate and vinyl versatate. One, two or three of these monomers may be used in any combination and in any quantitative ratio, depending upon the requirements which the end lacquer has to satisfy.

Examples of suitable β- or γ-hydroxyalkyl esters of monoethylenically unsaturated carboxylic acids include β- or γ-hydroxyalkyl esters of acrylic acid and methacrylic acid, in which case the β- or γ-hydroxyalkyl group is preferably a β-hydroxyethyl-, β-hydroxypropyl- or γ-hydroxypropyl group.

Suitable α-alkoxyalkyl isocyanates include in particular α-alkoxy-methyl isocyanates (alkyl $C_1$–$C_6$), α-methoxymethyl isocyanate being particularly preferred. These compounds are described in DAS 1,205,087.

The hydroxyl groups of polymer component (b) are preferably initially reacted with the dicarboxylic acid anhydrides to form the semi-esters until the polymer has an acid number of from 5 to 30 and preferably from 8 to 20. 50 to 100% of the residual hydroxyl groups are then converted into the corresponding urethane with α-alkoxyalkyl isocyanate.

Examples of suitable aromatic carboxylic acid anhydrides include the anhydrides of phthalic acid, tetrabromophthalic acid and tetrachlorophthalic acid.

The starting polymer is prepared in the conventional way, for example by polymerization in solution of the monomer (a) and the β- or γ-hydroxyalkyl ester of a mono-ethylenically unsaturated carboxylic acid. Any solvent that does not react with acids or acid anhydrides or with isocyanates may be used for this purpose. Examples of suitable solvents include aromatic hydrocarbons such as benzene, toluene, xylene, ketones such as acetone, methylethyl ketone, methylisopropyl ketone, carboxylic acid esters such as butyl acetate and amyl acetate and ethers or ether esters such as dioxane and ethoxyethyl acetate or propionate. These solvents are also suitable for use as diluents for the prepared lacquer solution. Alcohols such as n-butanol, tert.-butanol, isopropanol, amyl alcohol, cyclohexanol or ether esters of diols such as ethane diol monoacetate, ethane diol monomethylether or solvent mixtures, for example, of alkyl benzenes and alkanols, may additionally be used for this purpose.

A radical catalyst, for example, a peroxide, an azo compound or a peroxydicarbonate, is generally used to carry out polymerisation. It is also possible to use molecular weight regulators, for example, mercaptans or xanthogenates. Polymerisation is preferably carried out at temperatures in the range of from 40 to 130° C. resulting in the formation of a solution of the starting polymer. The polymer in this solution preferably has a hydroxyl number of from 40 to 140, especially from 60 to 120.

The polymer solution thus obtained is then directly reacted with the dicarboxylic acid anhydride, preferably at a temperature in the range of from 100° to 150° C. The carboxylic acid anhydride may be directly added to the polymer solution in a quantity sufficient to bring the acid number of the polymer to about 5–30 and preferably to 8–20. The quantity required for this purpose may readily be empirically established by determining the acid number.

The amount of hydroxyl groups still present can then be calculated, and between about 50 and 100% of the quantity of an α-alkoxyalkyl isocyanate equivalent to this quantity can be added to the solution. The reaction to form the urethane is usually carried out at 20–50° C. A catalyst, for example, a tertiary amine (trimethyl) amine), may be used for this purpose.

The solution thus prepared may then optionally be adjusted to the required solids content, for example 40–60%, by the addition of solvents after which it may be directly used as a stoving lacquer solution.

In one preferred embodiment, the monoethylenically unsaturated monomers are weighed in with the calculated quantity of xylene, tert.-dodecyl mercaptan and azodiisobutyronitrile or lauroyl peroxide and polymerised in a nitrogen atmosphere at 80° C. and further quantities of initiator may be added at intervals of two hours. Polymerisation is completed after some 10 hours.

The quantity of phthalic acid anhydride required for an acid number of 5–40, preferably 8–20, is then added, followed by approximately 1 hour's heating to 130–140° C. After cooling, methoxymethyl-isocyanate is added in a calculated quantity, followed by approximately 4 to 5 hours stirring at 30–40° C. (in the presence of catalytic quantities of triethylamine). At the end of this period, the isocyanate number of the solution is practically equal to the reagent value. Finally, the now approximately 60% solution is diluted with butanol to approximately 50%.

reacted for 3 hours at 55° C. with 6.5% by weight of methoxymethyl isocyanate in the presence of catalytic quantities of triethylamine and then diluted with butanol to a solids content of approximately 50%.

The prepared resin solution has an acid number of approximately 15 and a viscosity of approximately 120 seconds, as measured in a 6 mm. DIN-beaker.

Comparison Example 1

A starting copolymer similar to that used in the above example is reacted with 6.5% by weight of methoxymethyl isocyanate only. The completed resin solution has an acid number of 1.6 emanating from small quantities of methacrylic acid in the preparation of the methacrylic acid hydroxypropyl ester, and a viscosity of about 112 secs., as measured in a 6-mm. DIN beaker.

Comparison Example 2

A copolymer consisting of ethyl acrylate, styrene, acrylic acid and acrylic amide, in which most of the amide groups have been converted into N-butoxymethylamide groups and which is in the form of a 50% solution in xylene/butanol (1:1), was used for comparison. The polymer has a run-out time of 77 seconds, as measured in a 6 mm. DIN-beaker, and an acid number of approximately 15, based on the solids content.

White lacquers will be used to demonstrate the lacquer properties of lacquers based on the vehicles according to the invention.

200 g. of titanium dioxide pigment (Rutile) and 1 g. of a solution of calcium naphthenate in xylene (4% metal content) are added to 200 g. of a polymer solution with a solids content of about 50%. This mixture is ground twice on a 3-roll mill or any other suitable grinding machine.

The paste thus obtained is made into a lacquer with another 300 g. of polymer solution and, following the addition of 2.5 g. of silicone oil (1% in xylene), 10.0 g. of butanol and 15.0 g. of glycolic acid butylester, is adjusted with xylene/butanol (3:1) to a spraying viscosity of 20 seconds, as measured in a 4 mm. DIN-beaker.

In order to determine its properties, the lacquer is sprayed onto glass panels and onto 0.1 and 0.5 mm. thick steel plates. After approximately 10 minutes airing, the lacquer thus applied is stoved for 30 minutes at 130° C. and at 150° C.

| Lacquer resin | Gloss according to Gardner 20° angle | Pendulum hardness according to Konig 30', 130° C. | Pendulum hardness according to Konig 30', 150° C. | Erichsen impression 30', 130° C. | Erichsen impression 30', 150° C. | Bond strength lattice section | Xylene test [1] 30', 130° C. | Xylene test [1] 30', 150° C. | Yellowing [2] 30', 130° C. | Yellowing [2] 72 hrs., 180° C. |
|---|---|---|---|---|---|---|---|---|---|---|
| According to Example | 81 | 156" | 159" | 8.5 | 8.3 | Very good | + | + | −7.1 | −16.0 |
| Comparison Example 1 | 77 | 149" | 158" | 1.0 | 7.4 | Poor | − | + | −7.0 | −16.2 |
| Comparison Example 2 | 80 | 153" | 158" | 0.9 | 7.3 | Good | − | + | −9.0 | −26.9 |

[1] The xylene test was carried out as follows: The lacquer film was wetted for 15 minutes with a wad of cotton wool impregnated with xylene and covered with a watch glass. The lacquer film was evaluated after a regeneration time of 2 hours.
[2] Yellowing was measured with an electric remission photometer of the type manufactured by Messrs. Carl Zeiss using a 7 filter (420 mu) and a 1 filter (680 mu). The result is expressed by the difference between filter 7 and filter 1.
NOTE.—+ = No change (hardness, marking); − = Film swollen and soft.

Any organic and inorganic pigment may be used for pigmentation. Fillers and extenders may also be used.

The stoving lacquers based on the spontaneously crosslinking copolymers according to the invention may be applied to the substrates to be coated in any way, for example, by brush coating, spraying, dipping and rolling. After the airing time normally allowed for stoving lacquers, the film are stoved, for example, for 30 minutes at 130° C.

EXAMPLE

A starting copolymer with a viscosity of 1320 cp. (after dilution with butanol to a 50% solution), consisting of 44% by weight of ethyl acrylate, 27% by weight of styrene, 24% by weight of methacrylic acid hydroxypropyl ester and 5% by weight of vinyl versatate, in the form of a 60% solution in xylene, is heated for 1 hour to 140° C, with 4% by weight of phthalic acid anhydride, Comparison of the results as obtained demonstrates quite clearly the advantages of the coating agent produced from the copolymer according to the invention.

What is claimed is:

1. A lacquer mixture containing, as a self-crosslinking lacquer base, a urethane moiety containing polymer produced by reacting a copolymer of
   (a) 90 to 60% by weight of at least one monomer selected from the group consisting of alkyl esters of acrylic and methacrylic acids containing 1 to 18 carbon atoms in said alkyl moiety, acrylonitrile, methacrylonitrile, styrene, α-methylstyrene, vinyl toluene and vinyl esters of aliphatic carboxylic acids and
   (b) 10 to 40% by weight of a - or γ-hydroxyalkyl ester of a mono-ethylenically unsaturated carboxylic acid, said copolymer having a hydroxyl number of from 4 to 140, with an aromatic dicarboxylic acid anhydride to obtain a product having an acid number of from 5 to 30 and then reacting 50 to 100% of the remaining free hydroxyl groups of said latter product with an α-alkoxyalkyl isocyanate to produce said urethane moiety containing polymer.

2. The lacquer mixture of claim 1 wherein said acid number is from 8 to 20.

3. The lacquer mixture of claim 1 wherein said α-alkoxyalkyl isocyanate is methoxymethyl isocyanate.

References Cited

UNITED STATES PATENTS

| | | | |
|---|---|---|---|
| 3,480,591 | 11/1969 | Oertel | 260—75 |
| 3,423,354 | 1/1969 | Jones | 260—30.6 |
| 3,442,843 | 5/1969 | Keberle et al. | 260—29.2 |
| 3,451,952 | 6/1969 | Slocombe | 260—2.5 |
| 2,466,404 | 4/1949 | Fowler et al. | 260—77.5 |
| 3,225,119 | 12/1965 | Baker | 260—874 |
| 3,245,941 | 4/1966 | Mayer et al. | 260—31.6 |
| 3,422,165 | 1/1969 | Brotherton et al. | 260—859 |

OTHER REFERENCES

Roempp: Chemi Lexikon, vol. 4, p. 6899.

Kirk-Othine: Encyclopedia of Chemical Technology, vol. 10, Interscience, New York, p. 586.

Houben-Weye: Methoden der Organischen Chenie, vol. 14, part 1, 4th Ed. Georg Thieme, Stuttgart (1961), pp. 100–126, 811–822.

Deutzches Auslegeschift 1, 241, 104, May 24, 1967, Bayer A-G, Cl. 260, Subcl. 77.5 UX.

DONALD E. CZAJA, Primary Examiner

H. S. COCKERAM, Assistant Examiner

U.S. Cl. X.R.

260—31.4, 32.8, 33.2, 33.4, 33.6, 75